United States Patent [19]
Skoog

[11] Patent Number: 5,892,432
[45] Date of Patent: Apr. 6, 1999

[54] PERSONAL COMPUTER CONTROL AND ACTIVATION DEVICE UTILIZING A PAGING MESSAGE

[75] Inventor: Frederick H. Skoog, Colleyville, Tex.

[73] Assignee: Alcatel USA Sourcing, L.P., Plano, Tex.

[21] Appl. No.: 753,296

[22] Filed: Nov. 22, 1996

[51] Int. Cl.⁶ ................................................. G08B 23/00
[52] U.S. Cl. ................ 340/313; 340/825.44; 340/311.1; 379/93.25
[58] Field of Search ............................ 340/825.44, 311.1, 340/313; 379/93.25

[56] References Cited

U.S. PATENT DOCUMENTS

| | | | |
|---|---|---|---|
| 4,225,918 | 9/1980 | Beadle et al. | 395/200.47 |
| 4,644,351 | 2/1987 | Zabarsky et al. | 340/825.44 |
| 4,878,051 | 10/1989 | Andros et al. | 340/825.44 |
| 5,337,044 | 8/1994 | Folger et al. | 340/825.44 |
| 5,398,280 | 3/1995 | MacConnell | 379/93.25 |

FOREIGN PATENT DOCUMENTS

| | | | |
|---|---|---|---|
| 0434231 | 6/1991 | European Pat. Off. | G06F 15/02 |
| 9415431 | 7/1994 | WIPO | H04M 11/00 |
| 9502305 | 1/1995 | WIPO | H04Q 7/00 |

*Primary Examiner*—William M. Treat
*Assistant Examiner*—David M. Ovedovitz
*Attorney, Agent, or Firm*—Baker & Botts, L.L.P.

[57] ABSTRACT

A remote facilitation network (10) includes a base computing equipment environment (12) having a computer (14) and a control and activation device (16). A remote user (18) requests communications with the base computing equipment environment (12) through a wireless paging service (20). The remote user (18) generates a paging message that is transmitted by the wireless paging service (20) and received at the control and activation device (16). The control and activation device (16) processes and interprets the paging message in order to activate the computer (14). The paging message includes a callback number that is transferred from the control and activation device (16) to the computer (14). The computer (14) dials the callback number in order to establish a communication link with the remote user (18). After identification and verification, the computer (14) relinquishes control of the communication link to the remote user (18) such that information exchange can be initiated between the computer (14) and the remote user (18).

10 Claims, 1 Drawing Sheet

5,892,432

PERSONAL COMPUTER CONTROL AND ACTIVATION DEVICE UTILIZING A PAGING MESSAGE

TECHNICAL FIELD OF THE INVENTION

The present invention relates in general to computer systems and more particularly to a personal computer control and activation device.

BACKGROUND OF THE INVENTION

As the development of computing capability advances and the cost cutting measures performed by corporations continues, more and more business activity is being performed out of homes and small satellite offices. This business activity heavily relies on the use of personal computers. Personal computers, with supporting hardware and software products, allow for the development, collection, manipulation, local storage, and transportation of sensitive business information. With sensitive business information being located outside of a corporate managed environment, the corporation with work at home employees is susceptible to the loss, misuse, and misappropriation of strategic business information that it may not realize has been created. To manage the security of outside information bases, the corporation would require some mechanism to remotely access information created and maintained by outside employees. Therefore, it is desirable for a corporation to have secure remote access to business information outside of its internally managed environment.

SUMMARY OF THE INVENTION

From the foregoing, it may be appreciated that a need has arisen for a mechanism to provide a corporation an ability to access information from employees outside of the centrally managed environment of the corporation. In accordance with the present invention, a personal computer control and activation device is provided that substantially eliminates or reduces disadvantages and problems associated with remote information access.

According to an embodiment of the present invention, there is provided a personal computer control and activation device that includes a pager transceiver operable to receive a wireless paging message. A microcontroller decodes the wireless paging message and generates instructions therefrom. An interface circuit transfers the instructions from the microcontroller to a personal computer in order to activate and access the personal computer.

The present invention provides various technical advantages over conventional remote information access systems. For example, one technical advantage is to facilitate information access of a personal computer. Another technical advantage is to activate and control a personal computer through paging messages. Yet another technical advantage is to provide a system that allows for automatic remote access of information from a personal computer. Other examples are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
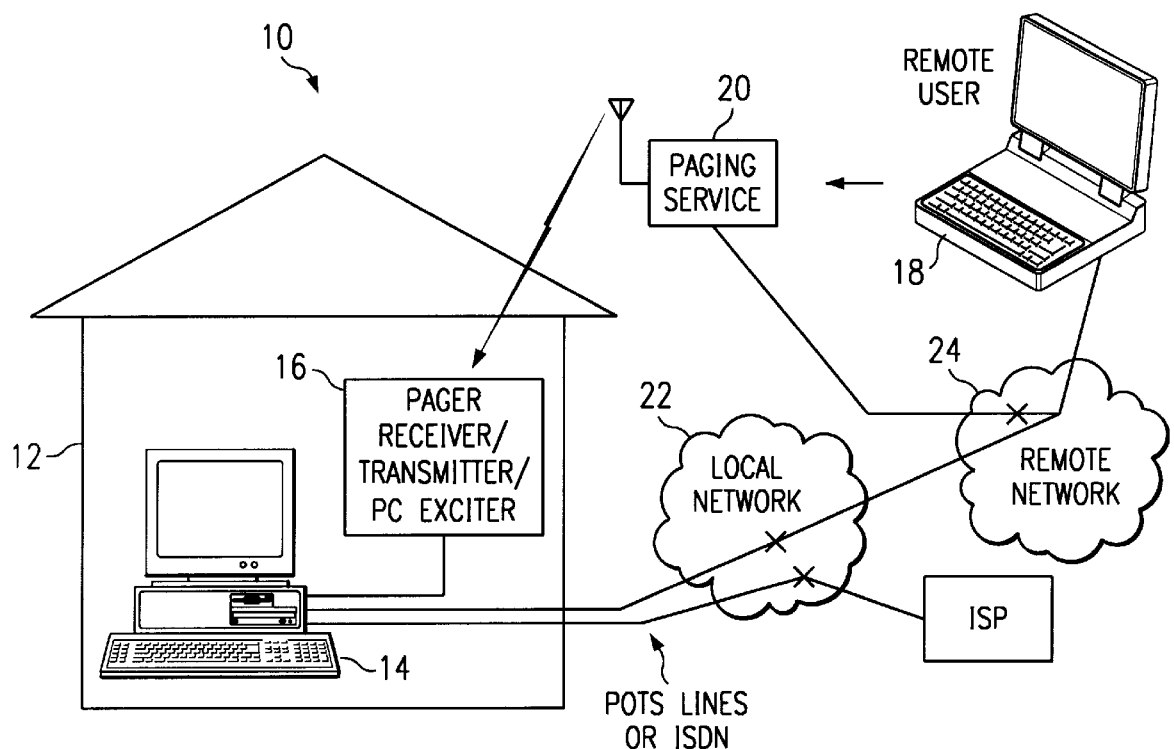
FIG. 1 illustrates a block diagram of a remote access facilitation network.

FIG. 1 is a block diagram of a remote access facilitation network 10. Remote access facilitation network 10 includes a base computing equipment environment 12 having a computer 14 and a control and activation device 16. A remote user 18 requests communications with base computing equipment environment 12 through a wireless paging service 20. Communications between remote user 18 and base computing equipment environment 12 occurs over one or more telecommunications networks, such as local network 22 and remote network 24. Remote user 18 may range from a portable computer up to a mainframe system providing virtual office building environment applications. Computer 14 may be a stand alone processor or may be a communications server on a corporate intranet to allow for remote access to a corporate system network. Software within computer 14 and remote user 18 provide the capability to allow remote user 18 to have remote access to computer 14 as initialized by control and activation device 16. Thus, an individual or mainframe database is capable of gaining secured access to information, applications, and services residing at base computing equipment environment 12 from a remote location.

In operation, remote user 18 activates a remote access application program from, for example, a portable computer. The application program implements a communication protocol to dial out to wireless paging service 20, for example through remote network 24. Upon response by paging service 20, remote user 18 transfers a callback number and any other control, status, and security codes or instructions to paging service 20. Remote user 18 then disconnects from remote network 24 to await a return call. Paging service 20 sends a paging message to control and activation device 16 of base computing equipment environment 12. The paging message may contain the callback number, a security code, and other desired instructions. Control and activation device 16 receives the paging message from paging service 20 and verifies that the correct codes were received. Control and activation device 16 activates computer 14 and provides computer 14 with the appropriate callback number. Computer 14 implements the remote access application program and dials the callback number provided by remote user 18. A communication link is established from computer 14 through local network 22 and remote network 24 to remote user 18 when remote user 18 answers the return call.

Security verification exchanges may occur prior to access in order to provide access protection through proper user identification procedures and limited access capabilities for the information within computer 14. Once communication between computer 14 and remote user 18 has been established, computer 14 transfers control to remote user 18 in order to perform information exchange, application execution, and service functions. A remote terminal application program may be initiated at remote user 18 in order to provide the communication exchange between computer 14 and remote user 18. Upon completion of the communication exchange session, the remote access application program may be recalled so that additional security information may be exchanged prior to terminating the communication link. Computer 14 and remote user 18 may each record and store an activity log file to document the exchanges that occurred during the communication exchange session.

Finally, computer 14 and remote user 18 release the connection and base computing equipment environment 12 may be powered down or placed in an idle sleep state if no further processing is to be performed.

The paging message sent by paging service 20 to control and activation device 16 may contain instructions for computer 14 to perform a task prior to dialing the callback number and establishing communications with remote user 18. This technique would allow computer 14 to prepare information requested by remote user 18 prior to the communication exchange session. The requested information may be sent immediately following any security verification exchanges between computer 14 and remote user 18 in order to reduce the potential toll call duration and charges associated with establishing the communication link.

When remote user 18 is in a virtual office building environment, the integrity of business information can be controlled and maintained despite being generated remotely from a central workplace, as for example by work-at-home employees having base computing equipment environment 12. Information generated in a work-at-home environment can be automatically backed up in a central information system maintained as a secured facility at remote user 18. Remote user 18 may be programmed to automatically access base computing equipment environment 12 during off-work hours, or whenever desired, in order to exchange information. The central information system at remote user 18 can obtain all new information generated in computer 14 and place this information into company accessible backup files. The central information system may also download information to computer 14, as in electronic mail and software application updates. A plurality of base computing equipment environments 12 may be paged simultaneously and serviced as each one calls in. Information security is maintained through this callback technique and through the exchange of security codes before any business information is allowed to be exchanged. Additionally, encryption techniques may be implemented during the access procedure to provide further security measures.

By using a paging service, a work-at-home employee will not be disturbed by a ringing telephone during an automatic access that may occur in the middle of the night. A separate dedicated access line is not required as computer 14 will wait until the line is idle before initiating a return call to remote user 18. Remote user 18 may also employ a control and activation device 16 to allow for unattended retrieval of information. Remote user 18 may request information from base computing equipment environment 12 that may take some time to prepare. When the requested information has been prepared, base computing equipment environment 12 sends a paging message to the control and activation device 16 at remote user 18. The control and activation device 16 activates remote user 18 in order to establish a communication link with base computing equipment environment 12. Base computing equipment environment 12 downloads the requested information to remote user 18. The download can be accomplished during the middle of the night or in the middle of a meeting without disturbing any nearby individual.

Figure 2:
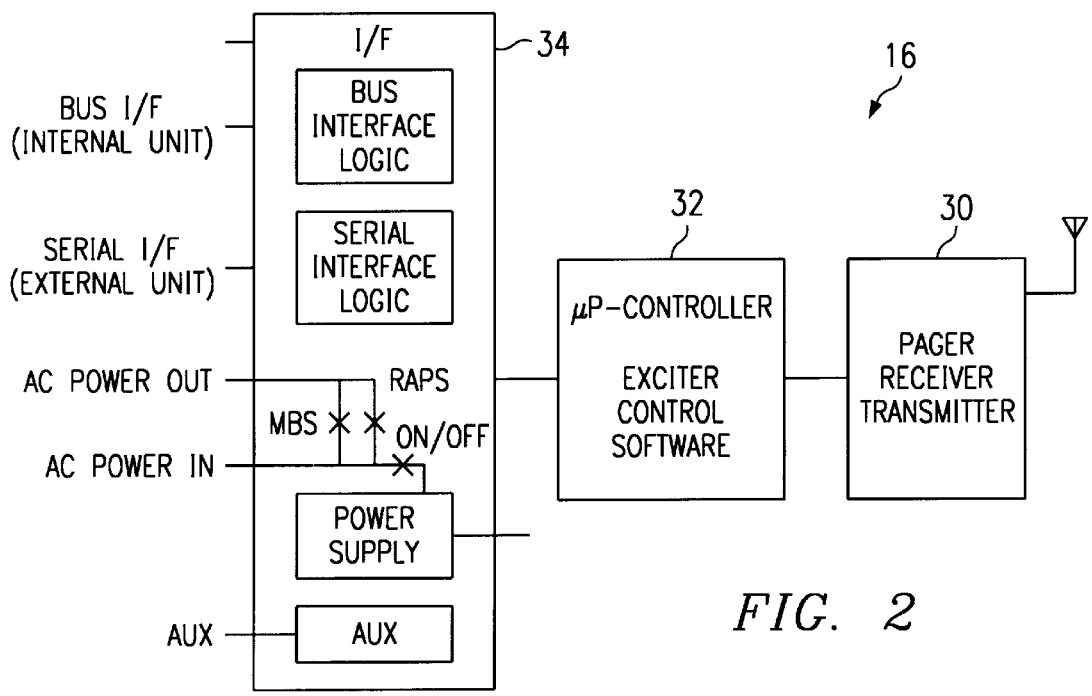
FIG. 2 illustrates a block diagram of a personal computer activation and control device used in the remote access facilitation network.

FIG. 2 shows a block diagram of control and activation device 16. Though shown as a separate component of base computing equipment environment 12, control and activation device 16 may also be internal or attached to computer 14. Control and activation device 16 includes a pager transceiver 30, a microcontroller 32, and an interface unit 34. Pager transceiver 30 receives a paging message from paging service 20 as generated by remote user 18 and is capable of sending a return paging message for two-way paging applications. Microcontroller 32 implements the remote access application program through a microprocessor and memory. Interface unit 34 accommodates the ability to alert and activate computer 14 and also provides the capability to exchange data with computer 14. A pager-controller Application Programmers' Interface (API) defines the exchange of information between pager transceiver 30 and microcontroller 32. For example, one technique for information exchange would be to emulate pager button actions and monitor pager display signals. An interface API defines the transfer of information between microcontroller 32 and interface unit 34 for the exchange of information between control and activation device 16 and computer 14.

In operation, pager transceiver 30 of control and activation device 16 receives one or more paging messages from paging service 20 as generated by remote user 18. The paging message(s) may include a callback number, action and identification codes, and coded instructions that is transferred to microcontroller 32 for processing over the pager-controller API. Microcontroller 32 screens the action and identification codes of the paging message for data integrity verification and/or authorized access validation. Microcontroller 32 notifies computer 14 of a receipt of a paging message by means of a power up signal or a bus interrupt signal transmitted to computer 14 over the interface API through interface unit 34. Upon activation of computer 14, microcontroller 32 communicates with computer 14 to transfer the callback number, any action and identification codes, and any instructions provided in the paging message. Microcontroller 32 may also transfer and receive any application dependent information to and from computer 14. Microcontroller 32 may receive status information from computer 14 in order to generate a reverse paging message for transmission by pager transceiver 30. The reverse paging message may include indications such as an acknowledgment that the paging message was received, communications to computer 14 could not be established, computer 14 is currently in use, a phone line is not currently available, and an alert message providing urgent information, among other various indications capable of being included in the reverse paging message.

Computer 14 receives a power on signal from microcontroller 32 through interface unit 34 and issues a bus wake-up command to initialize computer 14. The remote access application program is executed and communications are established between microcontroller 32 and computer 14. Security access and handshaking functions are performed to verify proper authorization. Information in the paging message is transferred from microcontroller 32 to computer 14. Computer 14 may transfer information to microcontroller 32 for the generation of a reverse paging message. Computer 14 dials the callback number to contact remote user 18. Remote user 18 answers the incoming call in order to establish a communication link with computer 14. After appropriate handshaking and verification is performed, computer 14 transfers control to remote user 18 in order to begin the information exchange. Upon termination of the information exchange, remote user 18 issues a disconnect command to computer 14. Computer 14 is returned to an inactive state either through remote user 18 or control and activation device 16 and made available for future activations or other uses.

Interface unit 34 includes an auxiliary port to support activation, deactivation, and status monitoring of any of a number of devices or appliances. For auxiliary port applications, control and activation device 16 interprets the paging message and provides control communications to a device or appliance through the auxiliary port. Control and activation device 16 may also receive status and alarm information from the appliance and communicate such information through a reverse paging message.

Thus, it is apparent that there has been provided, in accordance with the present invention, a personal computer control and activation device that satisfies the advantages set forth above. Although the present invention has been described in detail, it should be understood that various changes, substitutions, and alterations readily ascertainable by one skilled in the art can be made herein without departing from the spirit and scope of the present invention as defined by the following claims.

What is claimed is:

1. A control and activation device for a computer, comprising:

a pager transceiver operable to receive a wireless paging message;

a microcontroller operable to decode the wireless paging message and generate instructions therefrom;

an interface circuit operable to transfer instructions generated by the microcontroller to a computer in response to the paging message, wherein the microcontroller automatically generates a reverse paging message for transmission by the pager transceiver, the reverse paging message providing an indication of the status of the computer.

2. The control and activation device of claim 1, wherein the pager transceiver provides an indication to the microcontroller whether a wireless paging message has been received, a call back number is available, and a text message is available.

3. The control and activation device of claim 2, wherein the microcontroller provides a command to the pager transceiver to request transfer of the call back number and the text message.

4. The control and activation device of claim 1, wherein the controller activates the computer through the interface circuit and issues a bus wake up command in order to establish a communication link between the microcontroller and the computer through the interface circuit in response to receipt of the wireless paging message.

5. A method of remotely activating a computer, comprising steps of:

receiving a wireless paging message from a remote user;

activating the computer in response to the paging message; and automatically generating a reverse paging message in response to the paging message, the reverse paging message indicating a status of the computer.

6. The method of claim 5, further comprising steps of:

identifying a callback number within the paging message; and dialing the callback number at the computer to establish a communication path with the remote user.

7. The method of claim 6, further comprising a step of:

performing verification procedures between the computer and the remote user upon establishing the communication path.

8. The method of claim 7, further comprising a step of:

transferring operational control from the computer to the remote user in order to initiate information exchange upon determining that proper verification has been performed.

9. The method of claim 6, further comprising a step of:

exchanging information between the computer and the remote user upon establishing the communication path.

10. The method of claim 5, further comprising a step of:

transmitting the reverse paging message to the remote user, the reverse paging message including a status of the activation of the computer.

* * * * *